US010069996B2

(12) United States Patent
Adiletta et al.

(10) Patent No.: US 10,069,996 B2
(45) Date of Patent: Sep. 4, 2018

(54) SYSTEM AND METHOD FOR UTILIZING DIGITAL MICROMIRROR DEVICES TO SPLIT AND RECOMBINE A SIGNAL IMAGE TO ENABLE HEAT DISSIPATION

(71) Applicant: Xerox Corporation, Norwalk, CT (US)

(72) Inventors: Mark A. Adiletta, Fairport, NY (US); Christopher D. Atwood, Rochester, NY (US); Ali R. Dergham, Fairport, NY (US); Roger G. Leighton, Hilton, NY (US); Francisco Zirilli, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/266,041

(22) Filed: Sep. 15, 2016

(65) Prior Publication Data

US 2018/0077311 A1    Mar. 15, 2018

(51) Int. Cl.
| | | |
|---|---|---|
| *G03B 27/54* | (2006.01) | |
| *H04N 1/028* | (2006.01) | |
| *H04N 1/06* | (2006.01) | |
| *H04N 1/00* | (2006.01) | |

(52) U.S. Cl.
CPC ..... *H04N 1/02825* (2013.01); *H04N 1/00891* (2013.01); *H04N 1/00978* (2013.01); *H04N 1/02895* (2013.01); *H04N 1/06* (2013.01)

(58) Field of Classification Search
CPC ............... F21S 48/1145; F21S 48/1736; F21S 48/1757; G02B 26/0833; G02B 27/0933; G02B 27/1066; G02B 27/144; G02B 27/145; G02B 27/26; G02B 27/283; H04N 13/0427; H04N 13/0434; H04N 13/0459; H04N 9/3188; H04N 9/3105; H04N 1/00891; H04N 1/00978; H04N 1/02825; H04N 1/02895; H04N 1/06; G06T 3/40; G09G 5/02; G09G 5/18; G09G 2340/0407; G09G 2340/10; G03F 7/70283; G03F 7/70291; G03F 7/70275; G03F 7/70208; G03F 1/70; G03F 7/2002; G03F 7/70241; G03F 1/26; G03F 1/29; G03F 1/36; G03F 1/50; G03F 1/84; G03F 7/2024; G03F 7/7005; G03F 7/70058; G03F 7/70425
See application file for complete search history.

(56) References Cited

U.S. PATENT DOCUMENTS

| | | | |
|---|---|---|---|
| 5,061,049 A | 10/1991 | Hornbeck | |
| 5,298,365 A * | 3/1994 | Okamoto | ......... G03F 1/26 250/492.1 |
| 5,490,009 A | 2/1996 | Venkateswar et al. | |

(Continued)

*Primary Examiner* — Deoram Persaud
(74) *Attorney, Agent, or Firm* — Kermit D. Lopez; Luis M. Ortiz; Ortiz & Lopez, PLLC

(57) ABSTRACT

In an example embodiment, an image processing system can be implemented, which includes a printing surface and a prism that splits light from an input light source into two parallel light beams indicative of a signal image. Two or more DMDs (Digital Micromirror Devices) can be utilized, wherein the two parallel light beams are directed to the DMDs for image processing, such that as the two parallel light beams are reflected out onto the printing surface, the two parallel light beams are recombined into a single image, thereby enabling heat dissipation while "stitching" said output of said at least two digital micromirror devices to a usable video path.

20 Claims, 17 Drawing Sheets

(56) References Cited

U.S. PATENT DOCUMENTS

| | | | | |
|---|---|---|---|---|
| 6,133,986 A * | 10/2000 | Johnson | | G02B 21/0028 355/43 |
| 6,407,766 B1 * | 6/2002 | Ramanujan | | B41J 2/465 347/239 |
| 6,531,681 B1 * | 3/2003 | Markle | | B23K 26/0738 219/121.73 |
| 7,324,279 B2 | 1/2008 | Penn | | |
| 8,508,791 B1 | 8/2013 | Paul et al. | | |
| 9,137,504 B2 | 9/2015 | Gelb et al. | | |
| 9,344,696 B2 | 5/2016 | Kempf et al. | | |
| 9,971,147 B2 * | 5/2018 | Atwood | | G02B 26/0833 |
| 2001/0052920 A1 * | 12/2001 | Matsumoto | | B41J 2/04586 347/102 |
| 2003/0011769 A1 * | 1/2003 | Rakuljic | | G02B 6/2713 356/328 |
| 2003/0189692 A1 | 10/2003 | Kawano et al. | | |
| 2004/0160758 A1 | 8/2004 | Chang et al. | | |
| 2004/0190127 A1 * | 9/2004 | Williams | | G02B 1/02 359/361 |
| 2004/0239909 A1 * | 12/2004 | Bleeker | | G03F 7/70283 355/67 |
| 2005/0141076 A1 | 6/2005 | Bausenwein et al. | | |
| 2006/0018355 A1 * | 1/2006 | Feitisch | | H01S 5/4025 372/50.12 |
| 2006/0250582 A1 * | 11/2006 | Piehler | | G03B 21/14 353/20 |
| 2007/0126992 A1 | 6/2007 | Penn | | |
| 2007/0139620 A1 * | 6/2007 | Bruzzone | | G02B 27/1026 353/20 |
| 2008/0304030 A1 * | 12/2008 | Lous | | G03F 7/70283 355/53 |
| 2009/0257044 A1 * | 10/2009 | Sewell | | G03F 7/70208 355/71 |
| 2010/0007061 A1 * | 1/2010 | Feuilloley | | B29B 13/024 264/454 |
| 2010/0127431 A1 * | 5/2010 | Sandstrom | | G03F 7/70291 264/400 |
| 2010/0142757 A1 * | 6/2010 | Sandstrom | | G02B 26/105 382/100 |
| 2013/0321786 A1 * | 12/2013 | Markle | | G03B 27/42 355/67 |
| 2014/0111867 A1 | 4/2014 | Domm | | |
| 2014/0118711 A1 * | 5/2014 | Werschnik | | G02B 26/0841 355/67 |
| 2014/0318685 A1 * | 10/2014 | Farmer | | B23K 20/1245 156/73.5 |
| 2015/0070659 A1 * | 3/2015 | Chen | | G02B 27/48 353/38 |
| 2015/0070749 A1 | 3/2015 | McDonald et al. | | |
| 2015/0160454 A1 | 6/2015 | Bhakta | | |
| 2015/0165556 A1 * | 6/2015 | Jones | | B28B 1/001 264/482 |
| 2015/0177686 A1 * | 6/2015 | Lee | | G03H 1/0476 359/9 |
| 2015/0377446 A1 | 12/2015 | Bhakta | | |
| 2016/0158889 A1 * | 6/2016 | Carter | | G02B 6/42 219/76.12 |
| 2018/0067300 A1 * | 3/2018 | LeFevre | | G02B 26/02 |
| 2018/0088319 A1 * | 3/2018 | Atwood | | B81B 7/0019 |
| 2018/0088348 A1 * | 3/2018 | Ouderkirk | | B32B 37/1284 |
| 2018/0136495 A1 * | 5/2018 | Herrmann | | G02F 1/0121 |
| 2018/0136564 A1 * | 5/2018 | Herrmann | | G03F 7/702 |

* cited by examiner

SYSTEM AND METHOD FOR UTILIZING DIGITAL MICROMIRROR DEVICES TO SPLIT AND RECOMBINE A SIGNAL IMAGE TO ENABLE HEAT DISSIPATION

TECHNICAL FIELD

Embodiments are generally related to DMD (Digital Micromirror Device) systems and applications. Embodiments are also related to marking and printing methods and systems such as, for example, applications involving offset lithography. Embodiments also relate to systems, devices, and method for splitting and recombining a signal image to enable DMD heat dissipation and thereby reduce power consumption.

BACKGROUND

Offset lithography is a common method utilized in modern printing operations. (Note that for the purpose hereof, the terms "printing" and "marking" are interchangeable.) In a typical lithographic process, a printing plate (i.e., which may be a flat plate, the surface of a cylinder, belt, etc.) can be configured with "image regions" formed of, for example, hydrophobic and oleophilic material, and "non-image regions" formed of a hydrophilic material. Such image regions correspond to the areas on the final print (i.e., the target substrate) that are occupied by a printing or a marking material such as ink, whereas the non-image regions correspond to the areas on the final print that are not occupied by the marking material.

The Variable Data Lithography (also referred to as Digital Lithography or Digital Offset) printing process begins with a fountain solution used to dampen a silicone imaging plate on an imaging drum. The fountain solution forms a film on the silicone plate that is on the order of about one (1) micron thick. The drum rotates to an 'exposure' station where a high power laser imager is used to remove the fountain solution at the locations where the image pixels are to be formed. This forms a fountain solution based 'latent image'. The drum then further rotates to a 'development' station where lithographic-like ink is brought into contact with the fountain solution based 'latent image' and ink 'develops' onto the places where the laser has removed the fountain solution. The ink is hydrophobic. An ultra violet (UV) light may be applied so that photo-initiators in the ink may partially cure the ink to prepare it for high efficiency transfer to a print media such as paper. The drum then rotates to a transfer station where the ink is transferred to a printing media such as paper. The silicone plate is compliant, so an offset blanket is not used to aid transfer. UV light may be applied to the paper with ink to fully cure the ink on the paper. The ink is on the order of one (1) micron pile height on the paper.

The formation of the image on the printing plate can be accomplished with imaging modules. Each module can utilize a linear output high power infrared (IR) laser to illuminate a digital light projector (DLP) multi-mirror array, also referred to as the "DMD" (Digital Micromirror Device). The mirror array is similar to what is commonly used in computer projectors and some televisions. The laser provides constant illumination to the mirror array. The mirror array deflects individual mirrors to form the pixels on the image plane to pixel-wise evaporate the fountain solution on the silicone plate. If a pixel is not to be turned on, the mirrors for that pixel deflect such that the laser illumination for that pixel does not hit the silicone surface, but goes into a chilled light dump heat sink.

A single laser and mirror array can form an imaging module that provides imaging capability for approximately one (1) inch in the cross-process direction. Thus, a single imaging module simultaneously images a one (1) inch by one (1) pixel line of the image for a given scan line. At the next scan line, the imaging module images the next one (1) inch by one (1) pixel line segment. By using several imaging modules composed of several lasers and several mirror-arrays, butted together, an imaging function for a very wide cross-process width can be achieved.

One non-limiting example of a DMD system utilized in the context of a lithographic application is disclosed in U.S. Pat. No. 8,508,791 entitled "Image feedforward laser power control for a multi-mirror based high power imager" which issued to Peter Paul et al on Aug. 13, 2013, and is assigned to Xerox Corporation of Norwalk, Conn. U.S. Pat. No. 8,508,791 is incorporated herein by reference in its entirety.

A major problem with prior art DMD systems is that the light source is the input to the DMD that then reflects the signal processor controlled on/off digital output. The input light source generates too much heat into the DMD chip under certain applications resulting in the failure of the chip.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image processing and rendering/printing systems, devices, and methods.

It is another aspect of the disclosed embodiments to provide for an improved image processing and rendering/printing system that utilizes DMD components, systems, and/or applications.

It is yet another aspect of the disclosed embodiments to provide for improved marking and printing methods and systems such as, for example, offset lithography.

It is also an aspect of the disclosed embodiments to provide systems, devices, and methods for splitting and recombining a signal image to enable DMD heat dissipation and thereby reduce power consumption.

It is an additional aspect of the disclosed embodiments to provide systems, devices, and methods for spitting light beams and thermal optimization in the context of an image processing and/or printing system utilizing two or more DMDs.

The aforementioned aspects and other objectives and advantages can now be achieved as described herein. In an example embodiment, an image processing system can be implemented, which includes a printing surface and a prism that splits light from an input light source into two parallel light beams indicative of a signal image. Two or more DMDs (Digital Micromirror Devices) can be utilized, wherein the two parallel light beams are directed to the DMDs for image processing, such that as the two parallel light beams are reflected out onto the printing surface, the two parallel light beams are recombined into a single image, thereby enabling heat dissipation while "stitching" said output of said at least two digital micromirror devices to a usable video path.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
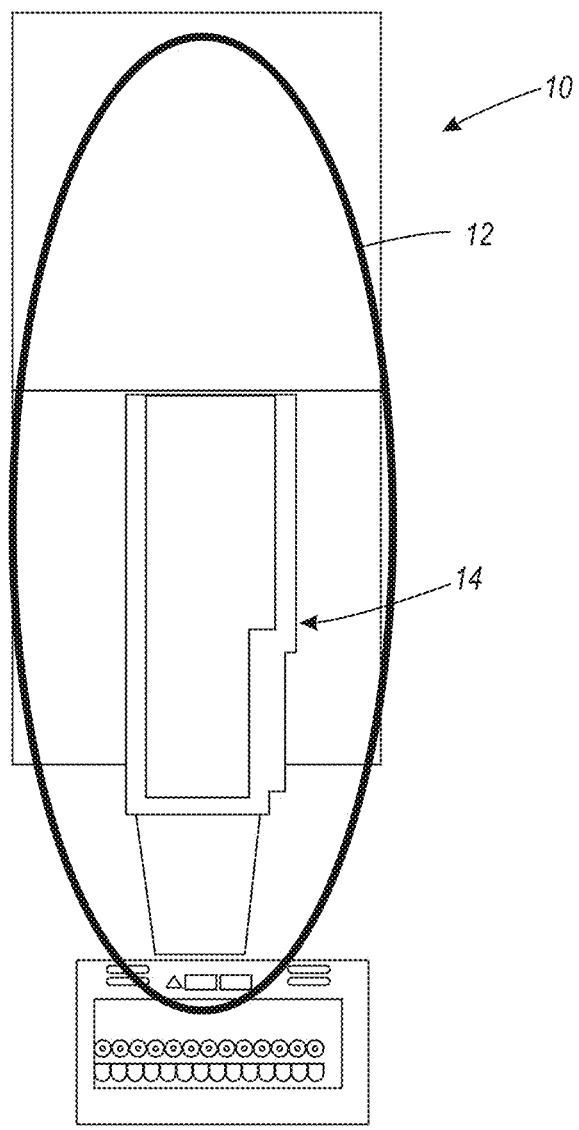
FIG. 1 illustrates an image of a marking and coding apparatus, which is shown generally within the bounds of an oval.

FIG. 1 illustrates an image 10 of a marking and coding apparatus 14, which is shown generally within the bounds of an oval 12. The marking and coding apparatus 14 shown in FIG. 1 incorporates the use of a DMD chip (not shown in FIG. 1). Note that the term or acronym "DMD" as utilized herein refers to a digital micromirror device, which is an optical semiconductor component that in a typical implementation has on its surface several hundred thousand microscopic mirrors arranged in an array (e.g., a rectangular array) corresponding to pixels in the image to be displayed. Such mirrors can be individually rotated to an "on" or "off" state. In the on state, light from a projector bulb is reflected into the lens making the pixel appear bright on the screen. In the off state, the light is directed elsewhere (usually onto a heatsink), making the pixel appear dark. As indicated previously, one of the major problems with contemporary DMD systems is that the light source is the input to the DMD that then reflects the signal processor controlled on/off digital output. The input light source generates too much heat into the DMD chip under certain applications resulting in the failure of the DMD chip.

Figure 2:
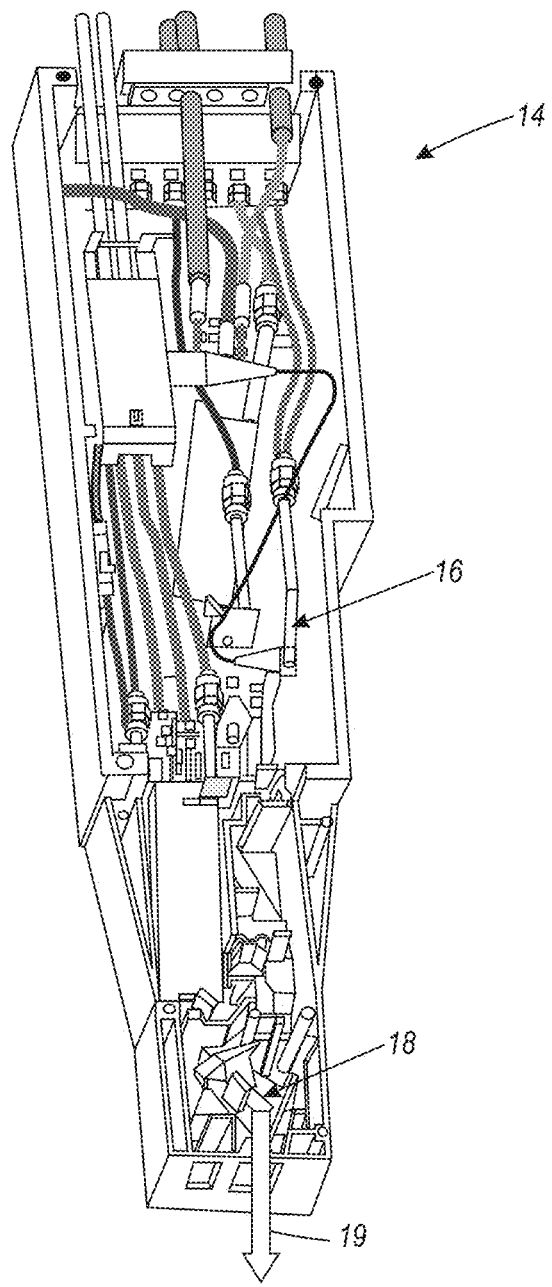
FIG. 2 illustrates a pictorial diagram depicting the components of the marking and coding apparatus shown in FIG. 1.
Figure 3A:
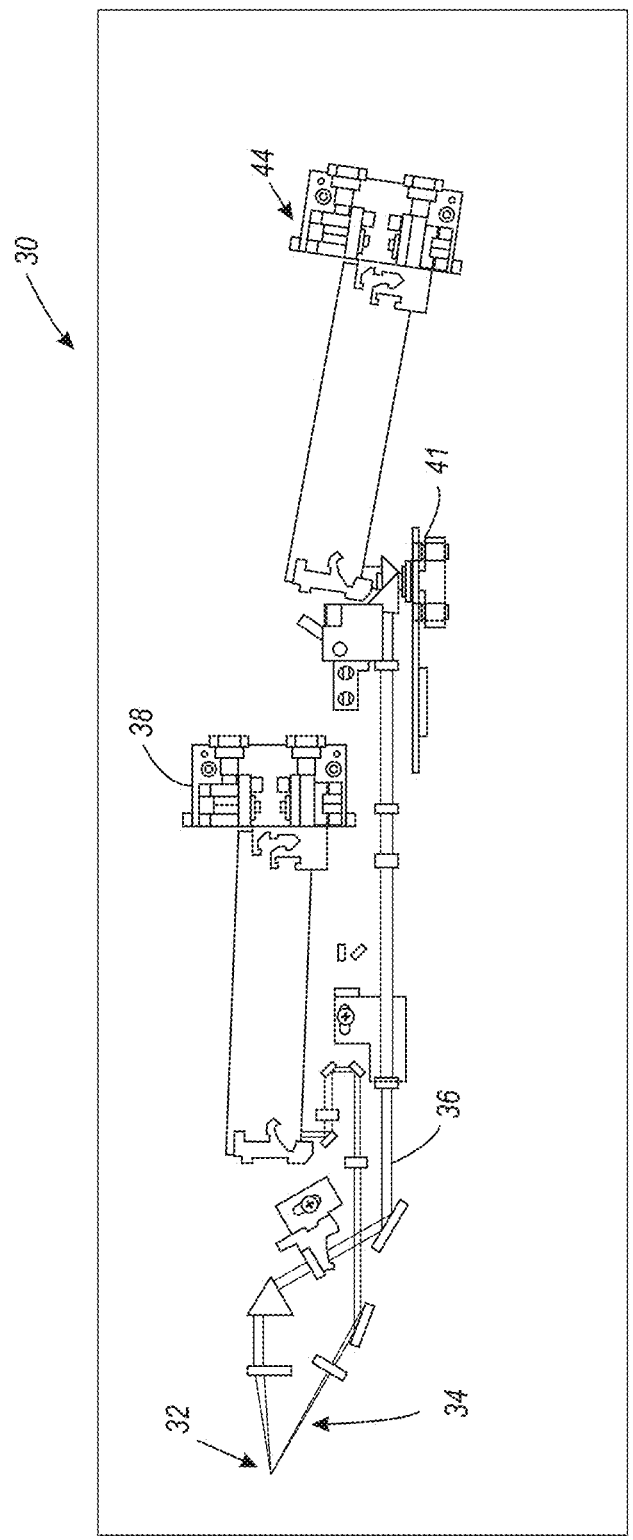
FIGS. 3A-3B illustrate pictorial diagrams of a system including imaging LDAs (Laser Diode Arrays) and temperature distribution on a mirror's surface.
Figure 3B:
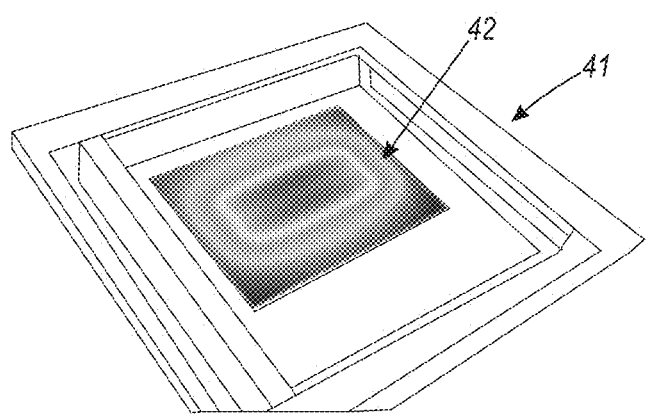

FIG. 2 illustrates a pictorial diagram depicting the components of the marking and coding apparatus 14, shown in FIG. 1. The apparatus 14 includes a DMD chip 16 (i.e., a DMD) and a beam output area 18 whose output path is generally indicated by arrow 19.

FIGS. 3A-38 illustrate pictorial diagrams of a system 30 that includes imaging LDAs (Laser Diode Arrays) and temperature distribution on a surface 42 of a DMD 41. The system 30 includes preheat LDAs 38 and imaging LDAs 44 shown with respect to a DMD such as DMD 41. Imaging ray paths 36 are shown with respect to the DMD 41, an image plane 32, and preheat ray paths 34.

Figure 4A:
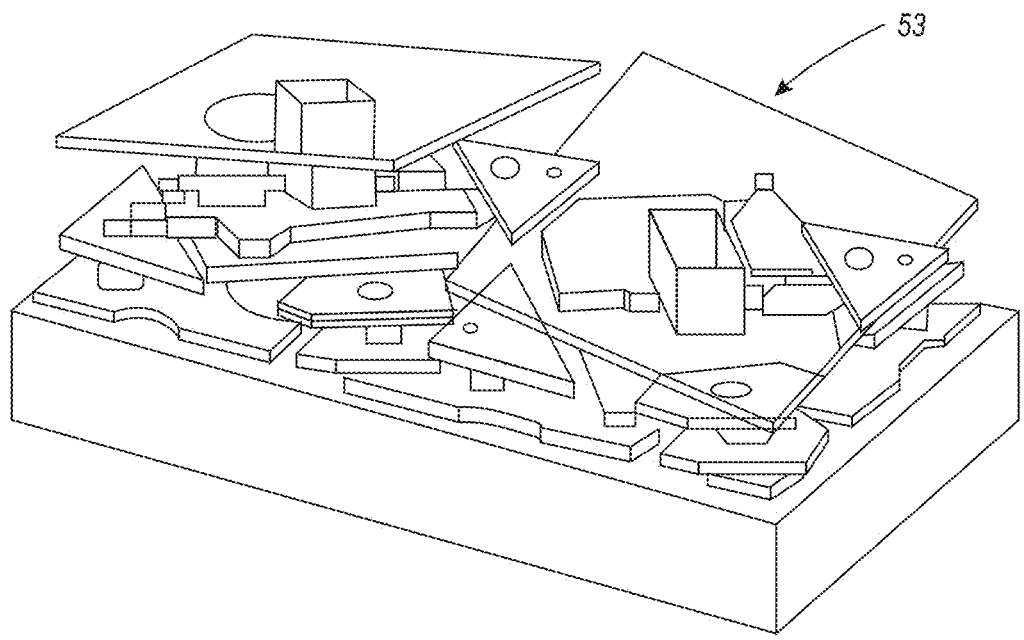
FIGS. 4A-4B illustrate pictorial diagrams depicting the internal components of a DMD.
Figure 4B:
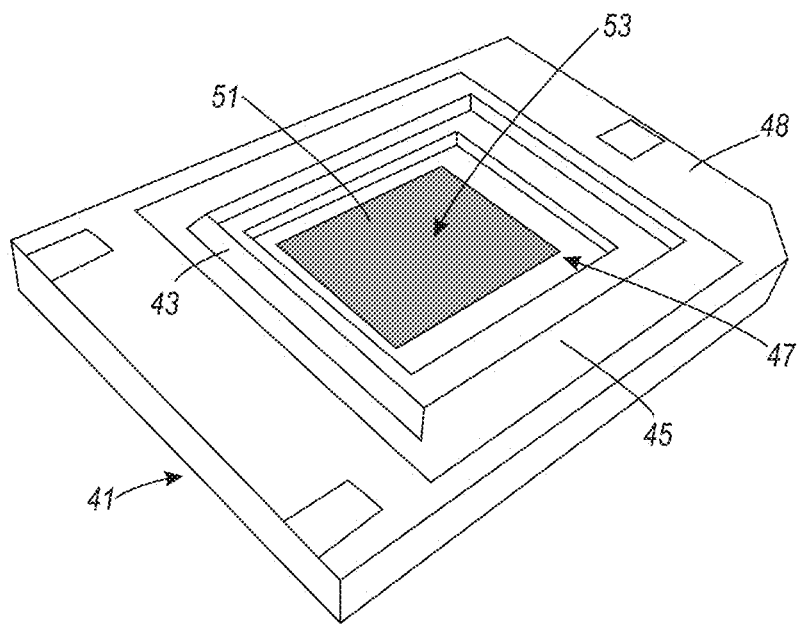

FIGS. 4A-4B illustrate pictorial diagrams depicting the internal components of the DMD 41. The example DMD 41 shown in FIG. 4B include a DMD silicon substrate 47, a DMD epoxy 45, a DMD housing 48 (e.g., which may be alumina), and a DMD bezel 43. The DMD mirror surface interface 51 is also shown in FIG. 4B upon which an assembly 53 shown in FIG. 4B is located. Note that in the configuration shown in FIG. 4B, the DMD window and socket are removed (not shown) for clarity.

Figure 5A:
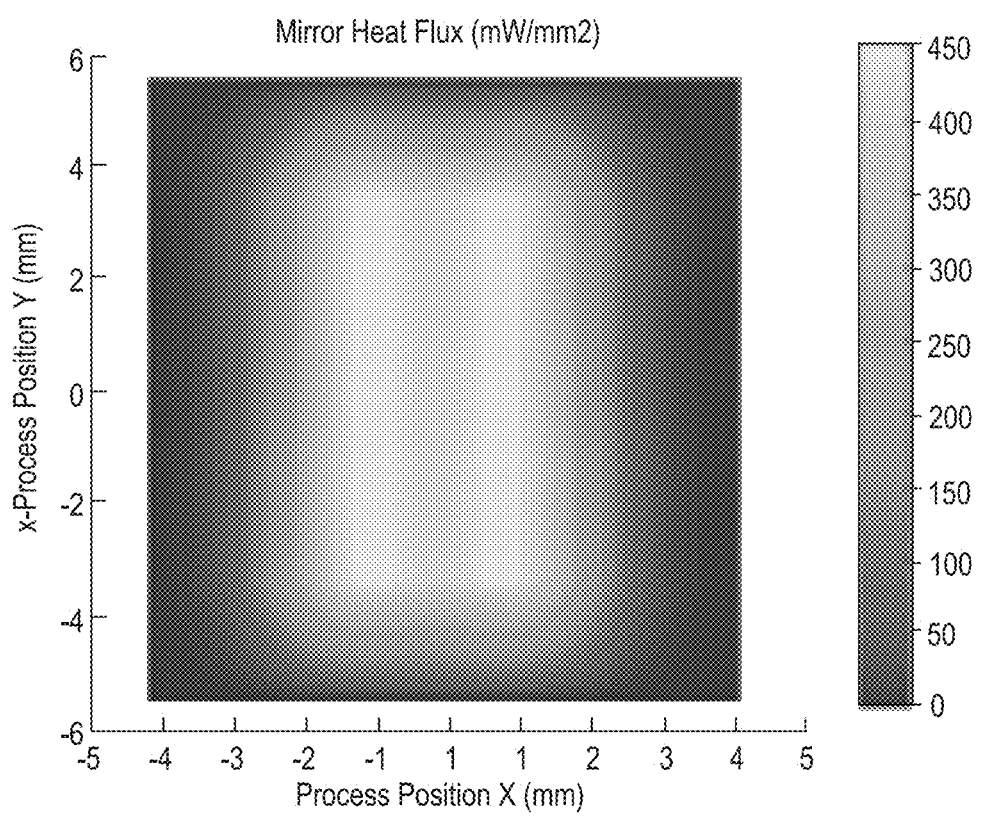
FIGS. 5A-5B illustrate graphs depicting data indicative of DMD incident energy.
Figure 5B:
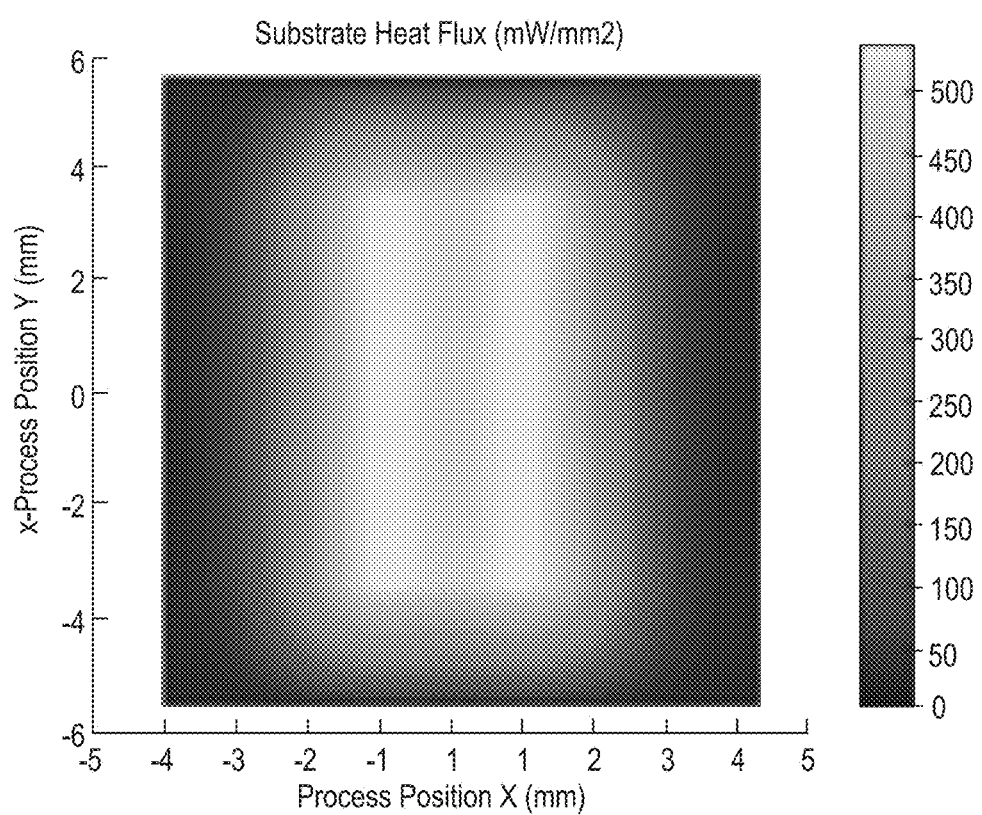

FIGS. 5A-5B illustrate graphs depicting data indicative of DMD incident energy. The graphs indicated the following data: Total Power at Mirrors: 17,030 mW; Total Power at Substrate: 20,291 mW; Average Heat Flux at Mirrors: 185 mW/mm2; and Average Heat Flux at Substrate: 221 mW/mm2.

Figure 6:
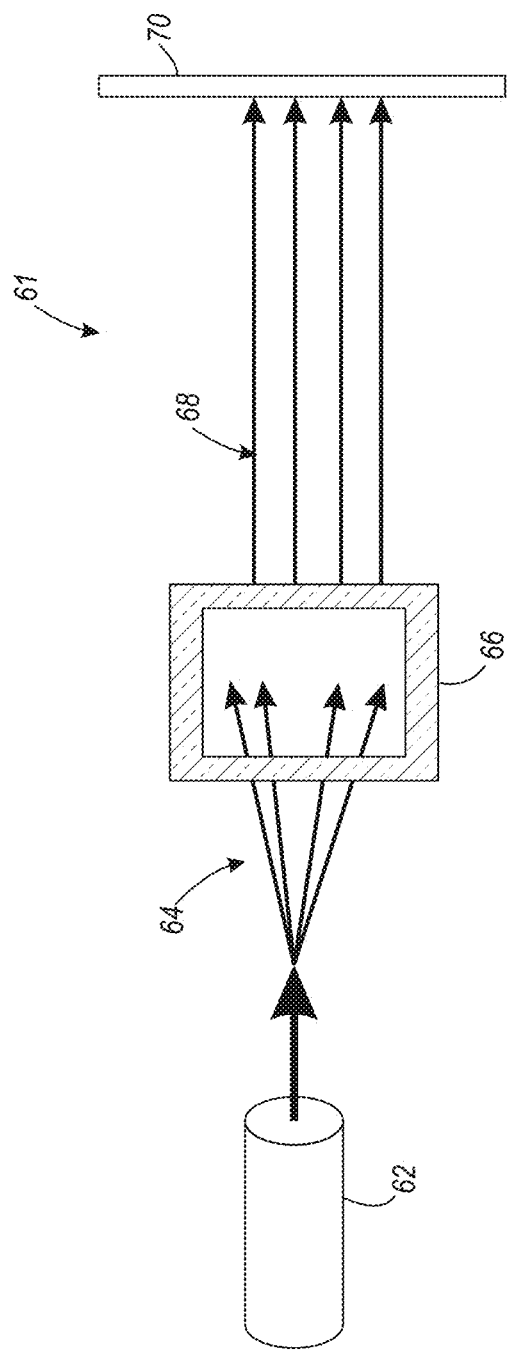
FIG. 6 illustrates a schematic diagram of a system in which an input light source is directed to a DMD chip.

FIG. 6 illustrates a schematic diagram of a prior art system 61 in which an input light source is directed to a DMD chip. The system 61 generally includes a light source 62 and a DMD chip 66. Arrows 64 indicate light from the light source with respect to the DMD chip 66. That is, the input light source is directed to the DMD chip 66 as indicated by arrows 64, and a signal processor (not shown) within the DMD chip 66 turns "on" or "off" the mirrors (e.g., such as, for example, one or more of the mirrors of the assembly 53 shown in FIG. 4) to generate the desired output image represented in FIG. 6 by arrows 68. The desired output image is rendered via, for example, the surface 70 shown in FIG. 6. The input light source includes 360 watts of energy deposited on the DMD chip 66, which exceeds the thermal dissipation capacity of the DMD chip 66, resulting in a very premature DMD chip failure.

Figure 7A:
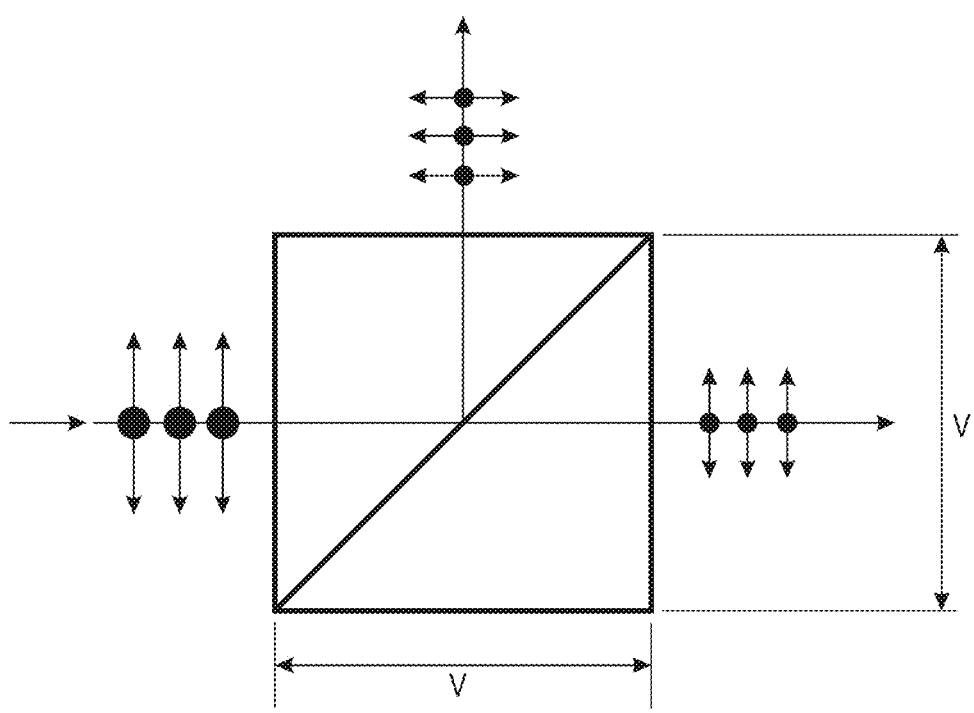
FIGS. 7A-7B illustrate schematic diagrams of a system in which the input light source is split into parallel beams using a prism and then directed on a DMD chip for image processing, in accordance with an example embodiment.
Figure 7B:
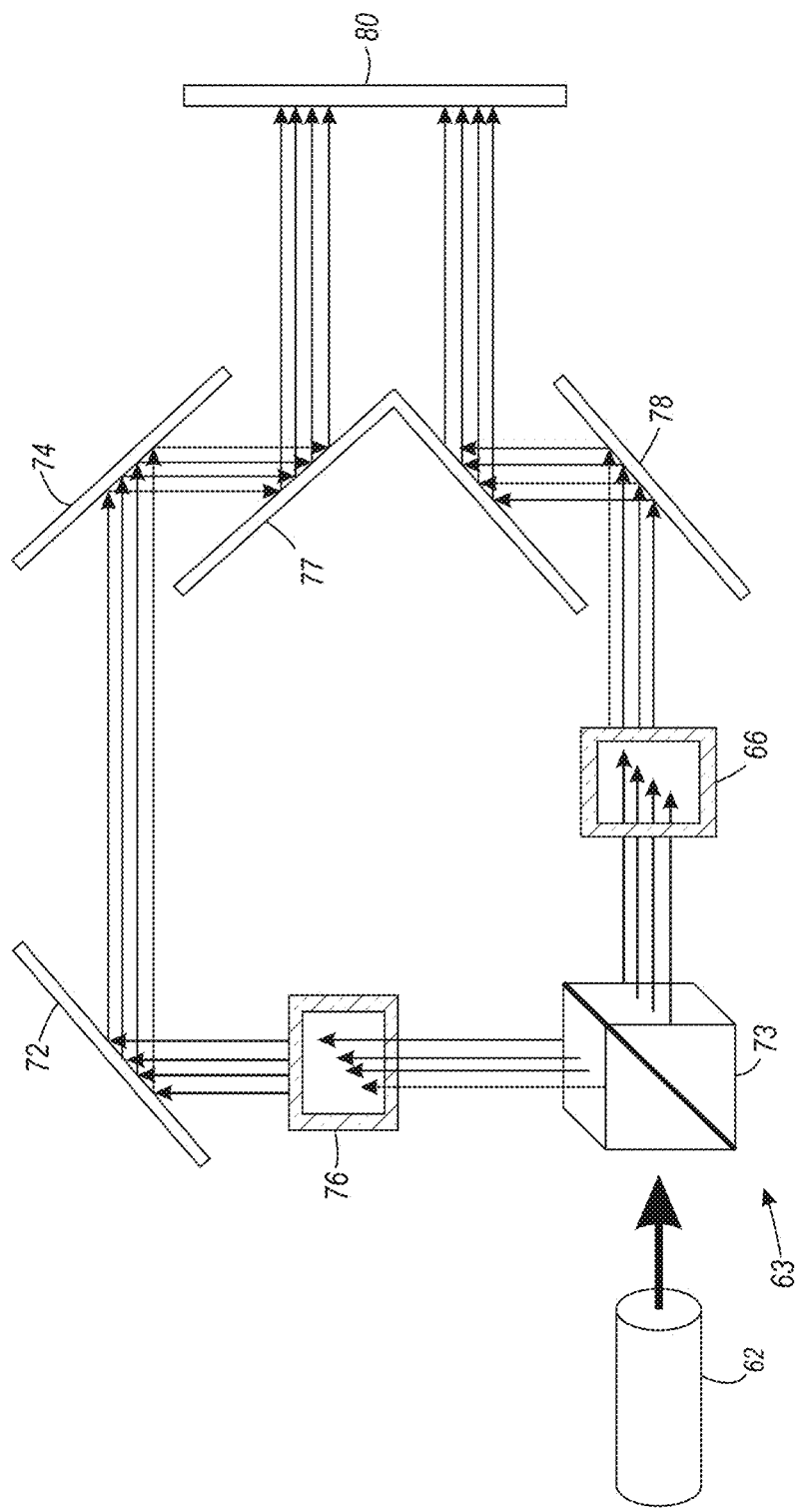

FIGS. 7A-7B illustrate schematic diagrams of a system 63 in which the input light source (i.e., light from the light source 62) is split into parallel beams using a prism 73 and then directed at two or more DMD chips (e.g., DMDs 66 and 76) for image processing, in accordance with an example embodiment. The system 63 depicted in the embodiment shown in FIG. 78 includes a plurality of mirrors 72, 74, 77, 78 for directing the light beams toward a surface 80. That is, as shown in FIG. 7B, the input light source is "split" into two parallel beams using the prism 73, and then directed onto the DMD chips (i.e., DMD's 66, 76) for image processing. Then, as the light is reflected out onto the printing surface 80, a software algorithm can 'stitch' the dual beams back to a single image.

Thus, a DMD chip is subject to 360 watts of energy under the current architecture, which exceeds the heat dissipation limits of the chip as shown in FIG. 6. The embodiment depicted in FIG. 7B, on the other hand, uses a prism 73 to split the input light source, then directs the 2 parallel light beam at two DMD chips, thus reducing the energy to each chip, and uses a software algorithm to "stitch" the output of the two DMD chips to a usable video path.

Figure 8:
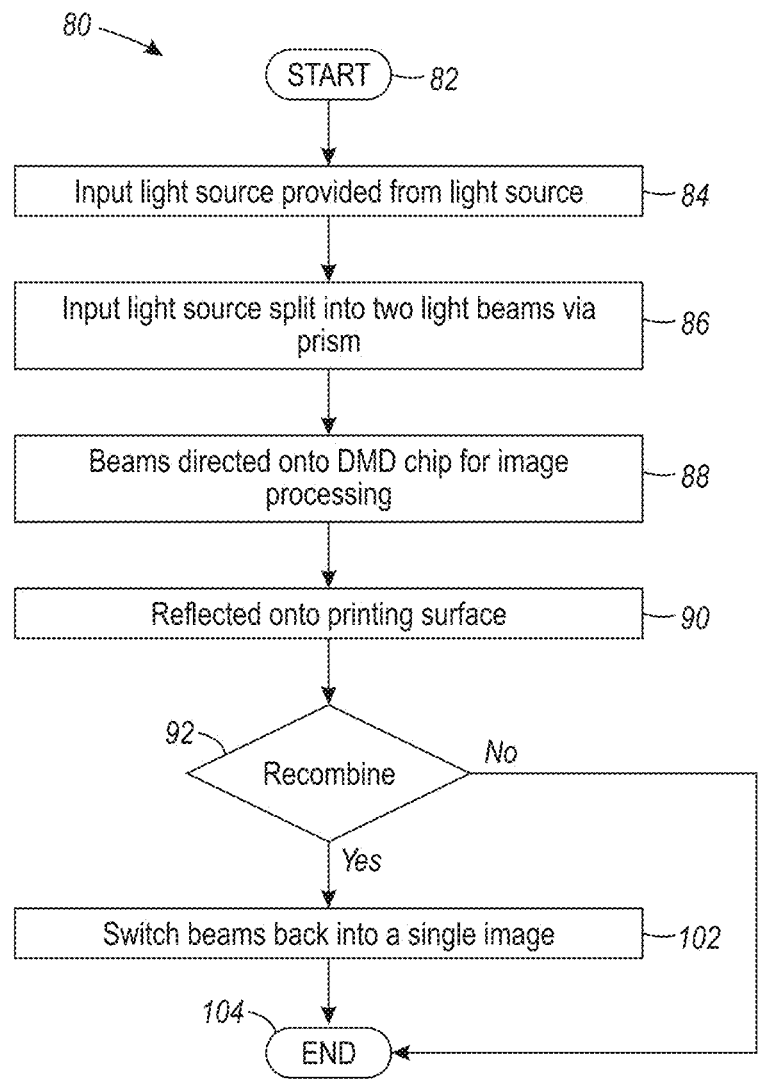
FIG. 8 illustrates a flow chart of operations depicting a method for utilizing two DMDs to split and recombine a signal image to enable DMD heat dissipation, in accordance with an example embodiment.

FIG. 8 illustrates a flow chart of operations depicting a method 80 for utilizing two DMDs to split and recombine a signal image to enable DMD heat dissipation, in accordance with an example embodiment. As indicated at block 82, the process begins. Thereafter, as shown at block 84, the input light source is provided by (or from) a light source as described in greater detail herein. Next, as indicated at block 86, the input light is split into two light beams via the prism as discussed herein. Then, as shown at block 88, the beams are directed onto the DMD chip (i.e., the "DMD") for image processing. Thereafter, as illustrated at block 90, the light is reflected onto the printing surface. A recombination operation (as discussed herein) can be implemented, as indicated at decision block 92. If "no," then the process ends as shown at block 104. If "yes," then as indicated at block 102, the beams are switched back into or to a single image. Thereafter, the process terminates as shown at block 104.

Figure 9:
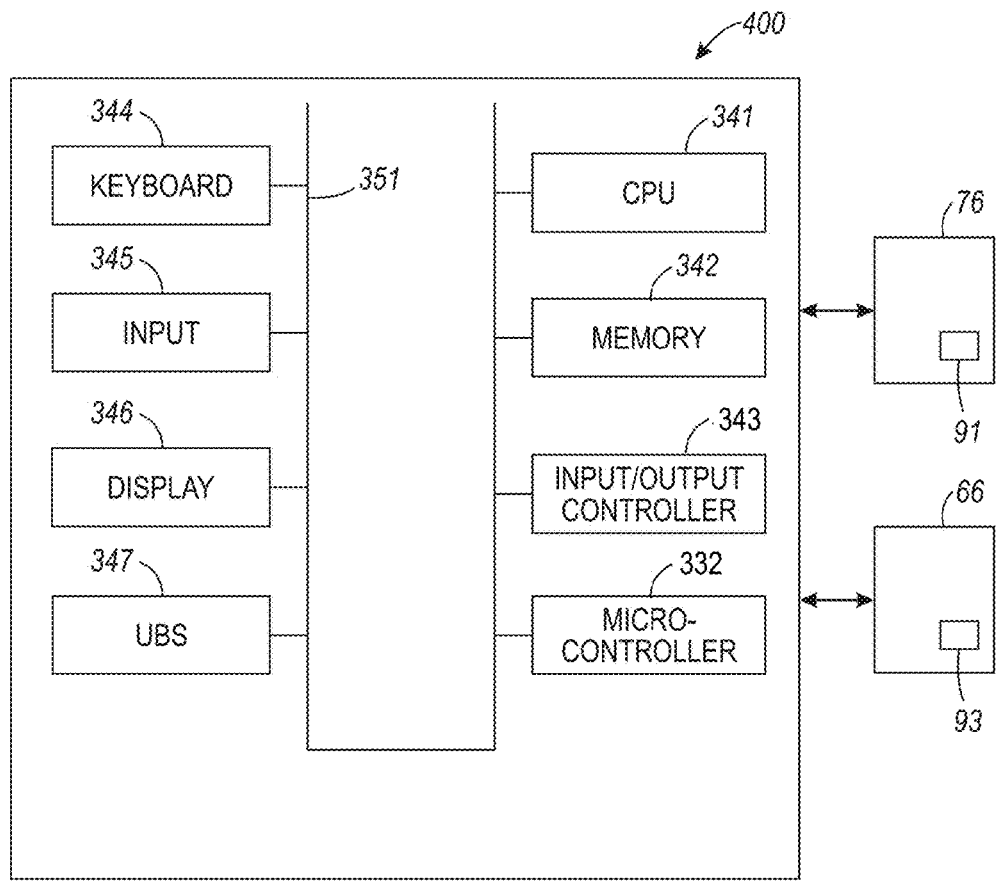
FIG. 9 illustrates a system for data-processing apparatus, or system that can be utilized to implement instructions for allowing two DMDs to split and recombine a signal image to enable DMD heat dissipation, in accordance with an example embodiment.

FIG. 9 illustrates a system for data-processing apparatus or system 400 that can be utilized to implement instructions for allowing two DMDs 76 and 66 to split and recombine a signal image to enable DMD heat dissipation, in accordance with an example embodiment. As depicted in FIG. 9, some embodiments may be implemented in the context of a data-processing system 400 that can include one or more processors such as a CPU (Central Processing Unit) 341, a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, a microcontroller 332, which may be implemented in the context of software and/or hardware.

Such a microcontroller 332 may communicate electrically with, for example, the DMDs 76, 66 and/or other related components as discussed herein such as, for example, signal processors 91 and/or 93. Note that each DMD 66, 76 generally include a respective signal processor 91 and 93. Communication between the DMDs 76, 66 and/or the signal processors 91, 93 and the data-processing system 400 can be implemented via wireless and/or wired communications means. In some example embodiments, the microcontroller 343 may provide control signals to the DMDs 76 and/or 66.

Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

Figure 10:
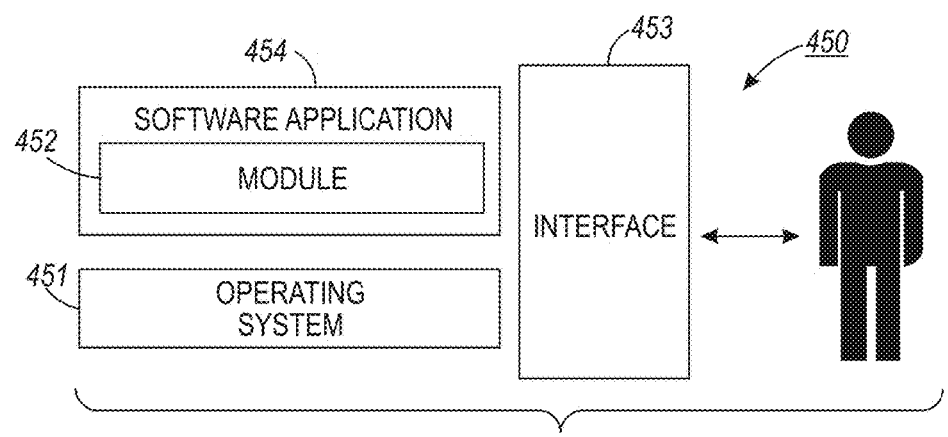
FIG. 10 illustrates a schematic view of a software system including a module, an operating system, and a user interface, in accordance with an example embodiment.

FIG. 10 illustrates a computer software system 450 for directing the operation of the data-processing system 400 shown in FIG. 9. The software application 454, stored for example in memory 342, generally includes the module 452. The computer software system 450 further includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include the various steps or operations described at blocks 82, 84, 86, 88, 90, 92, 102, and 104 of method 80 depicted in FIG. 8.

The following discussion is intended to provide a brief, general description of suitable computing environments in which the system and method may be implemented. Although not required, the disclosed embodiments will be described in the general context of computer-executable instructions, such as program modules being executed by a single computer. In some instances, a "module" constitutes a software application. However, a module may also be composed of, for example, electronic and/or computer hardware or such hardware in combination with software. In some cases, a "module" can also constitute a database and/or electronic hardware and software that interact with such a database. In some instances, a module may constitute an electronic and/or electro-mechanical hardware component such as a laser imaging module and other modules as discussed herein.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can in some instances refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the various instructions or steps such as described herein, can be implemented in the context of such a module or modules, sub-modules, and so on. In other instances, the term module as utilized herein may refer to a hardware component such as, for example, a laser imaging module, or may refer to a combination of hardware and software (e.g., a combination of a software module and a hardware module).

FIGS. 9-10 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 11:
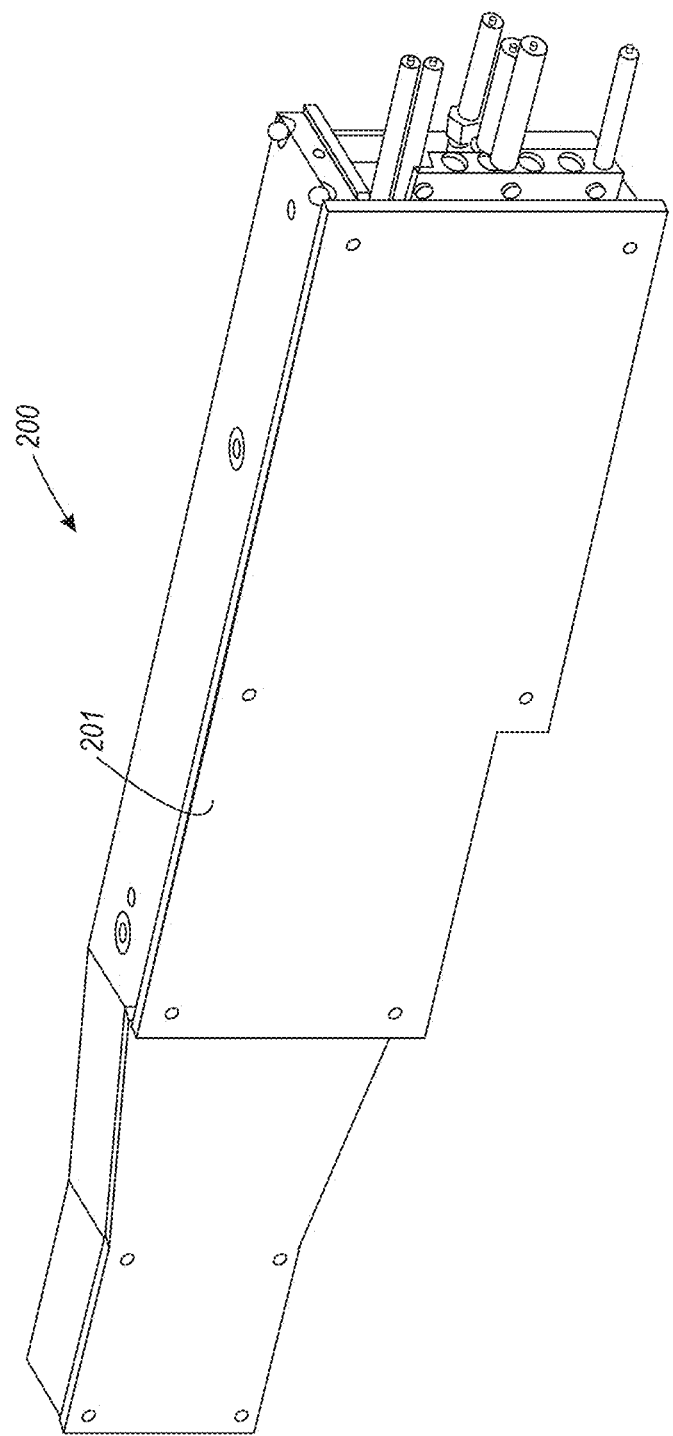
FIG. 11 illustrates a pictorial view of an LIM (Laser Imaging Module) fully enclosed during operation, in accordance with an example embodiment.
Figure 12:
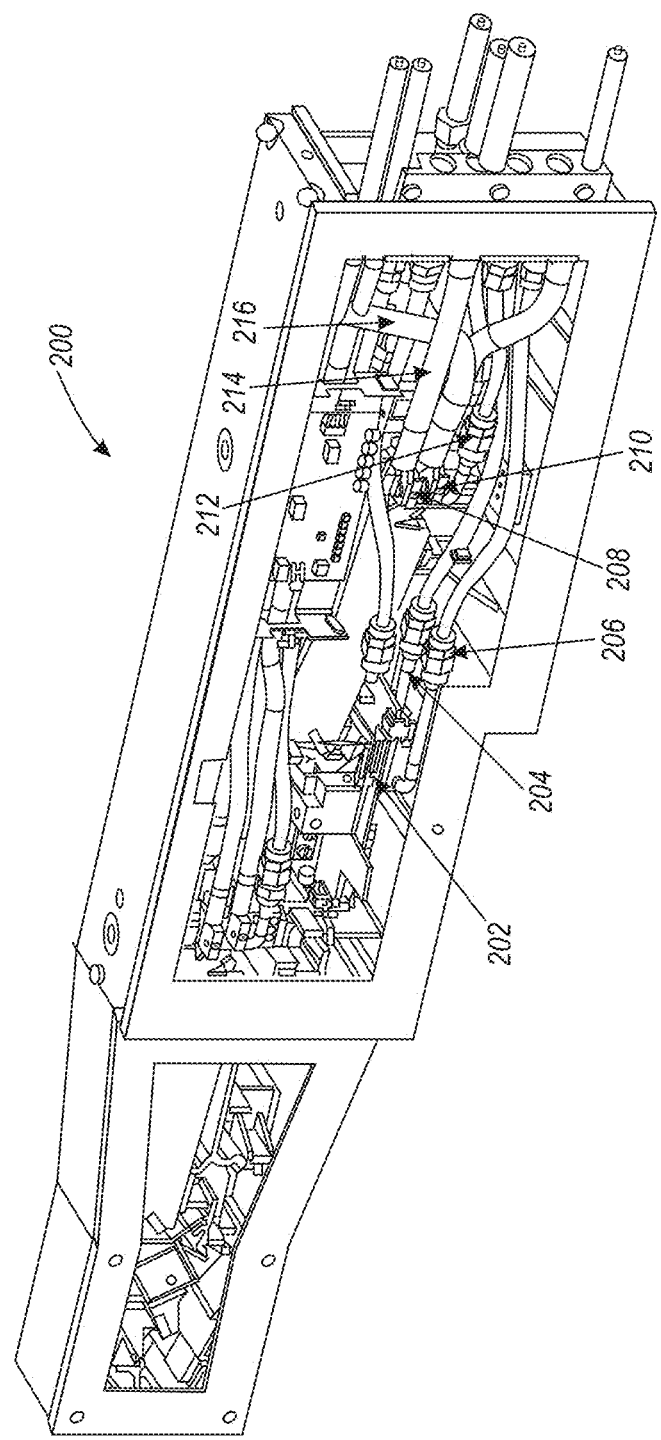
FIG. 12 illustrates a pictorial view of the LIM depicted in FIG. 11 with the front cover removed, in accordance with an example embodiment.

FIG. 11 illustrates a pictorial view of a LIM (Laser Imaging Module) 200 fully enclosed during operation, in accordance with an example embodiment. The LIM is shown with the front cover 201 attached. FIG. 12 illustrates a pictorial view of the LIM 200 depicted in FIG. 11 with the front cover 200 removed, in accordance with an example embodiment. In FIG. 12, a DMD 202 is shown along with DMD cooling lines 204 and 206, laser diodes 208 and 210, and laser diode cooling and electrical lines 212, 214, and 216.

Figure 13:
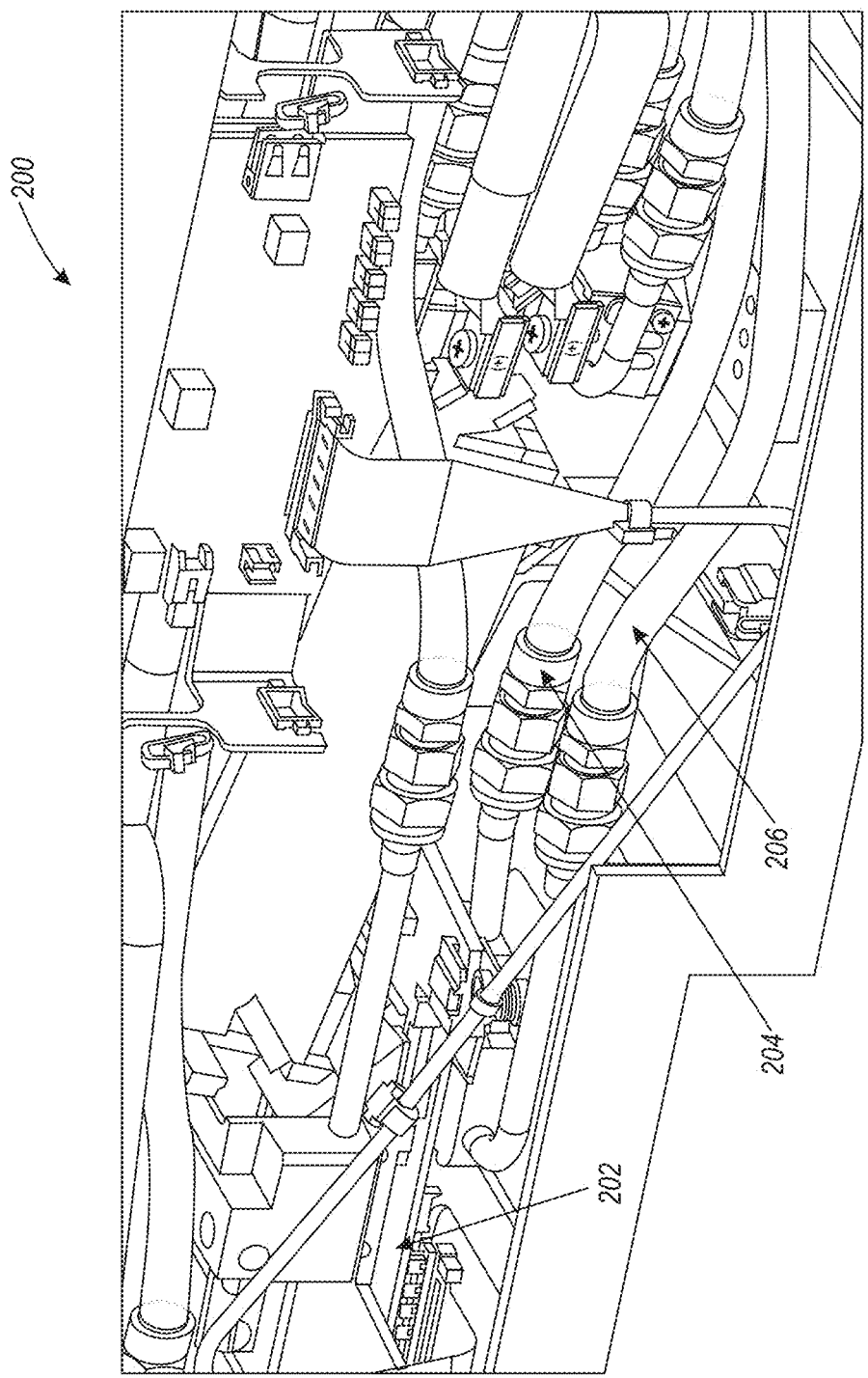
FIG. 13 illustrates a pictorial close up view of the DMD and DMD cooling lines associated with the LIM depicted in FIGS. 11-12, in accordance with an example embodiment.
Figure 14:
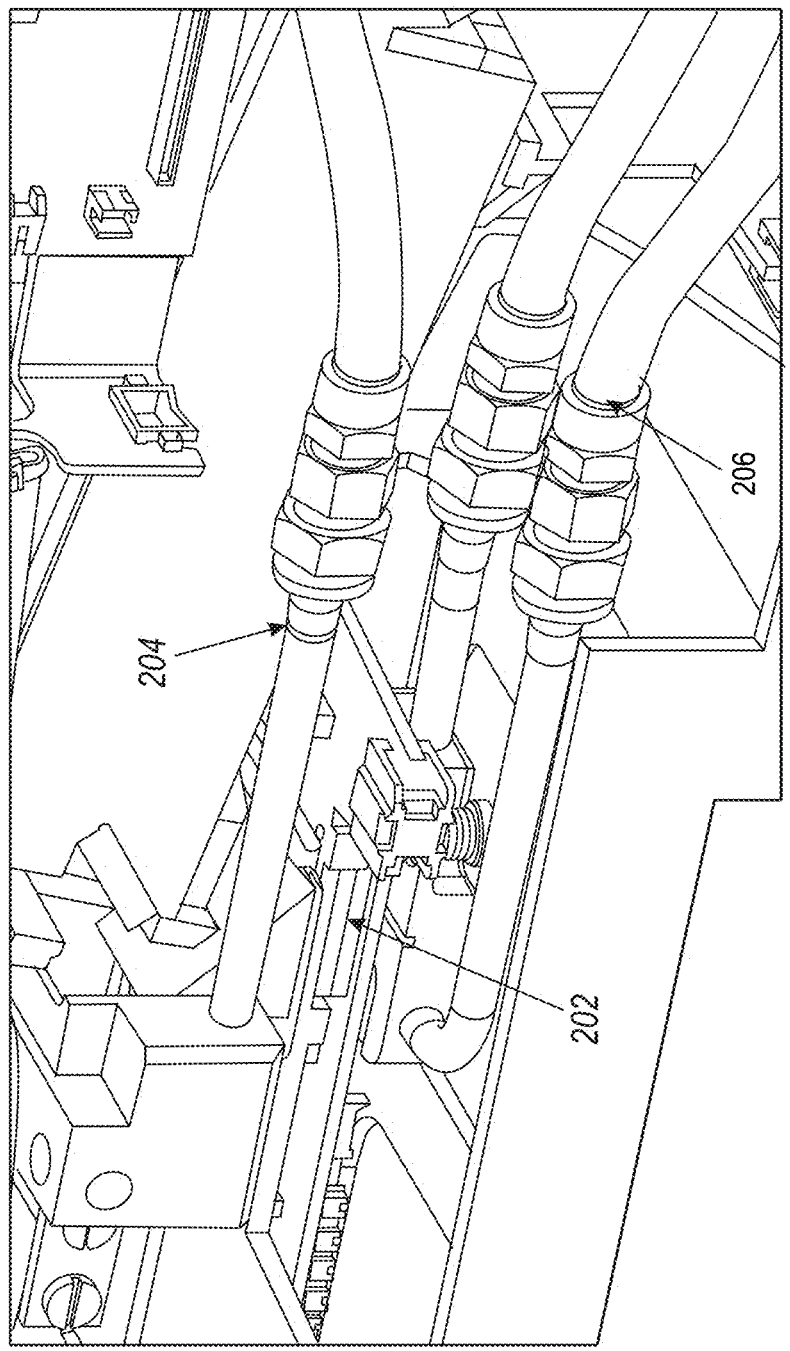
FIG. 14 illustrates another close up view of the DMD and DMD cooling lines with some components removed for daily, in accordance with an example embodiment.
Figure 15:
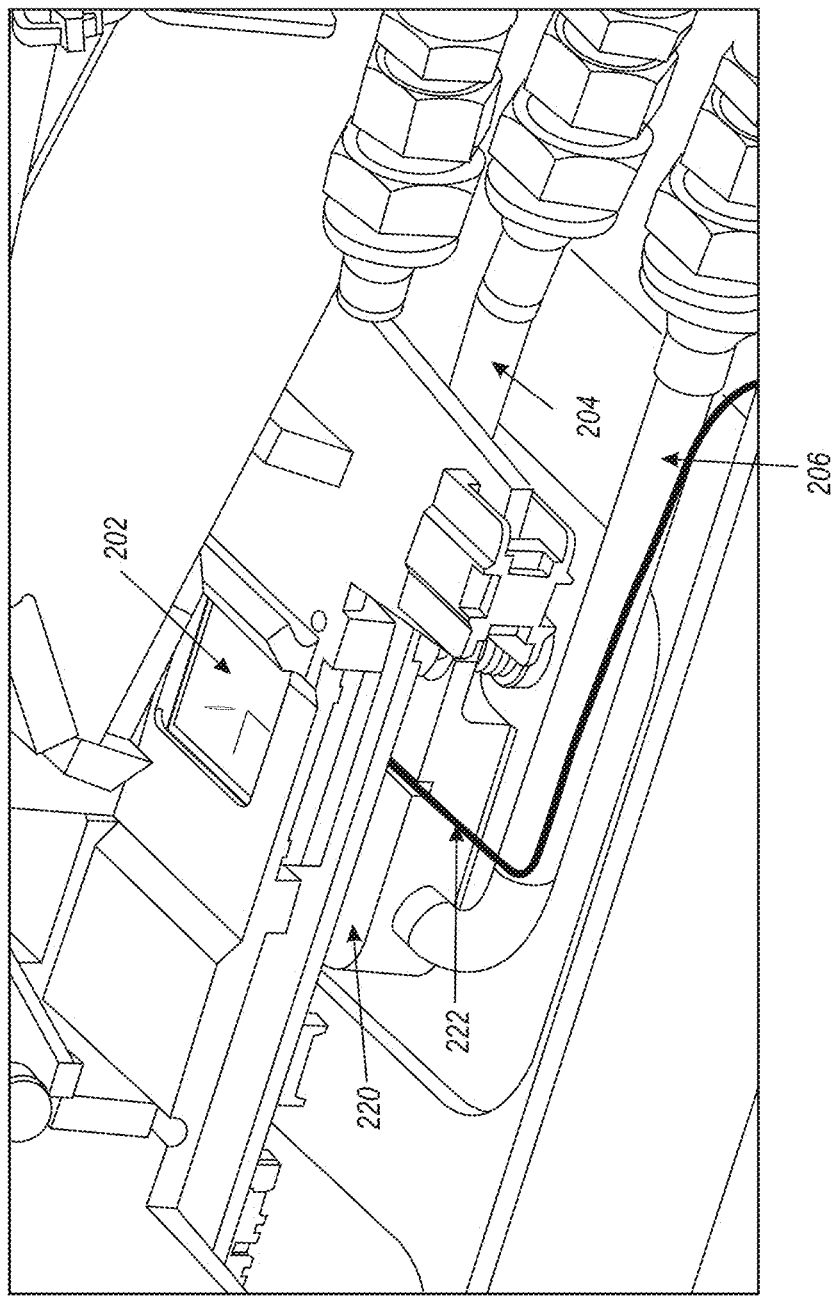
FIG. 15 illustrates an alternative view of the DMD and DMD cooling lines along with a thermistor wire and a cooling block, in accordance with an example embodiment.

FIG. 13 illustrates a pictorial close up view of the DMD 202 and DMD cooling lines 204 and 206 associated with the LIM 200 depicted in FIGS. 11-12, in accordance with an example embodiment. FIG. 14 illustrates another close up view of the DMD 202 and DMD cooling lines 204 and 206 with some components removed for clarity, in accordance with an example embodiment FIG. 15 illustrates an alternative view of the DMD 202 and DMD cooling lines 204 and 206 along with a thermistor wire 222 and a cooling block 220, in accordance with an example embodiment.

The example embodiment shown in FIGS. 11-15 can implement an application where the LIM 200 is used to print on several substrates with various applications such as product coding, code coding, labeling, etc. Such applications can utilize a pre-applied coating on a target surface such that when applied to laser light, a reaction takes place that "develops the image" onto the surface. It is for this application that the input power to the DMD 202 is high.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An image processing system, comprising:
a printing surface;
a prism that splits light from an input light source into two parallel light beams indicative of a signal image; and
at least two digital micromirror devices, wherein each of said at least two digital micromirror devices comprises at least one signal processor and an optical semiconductor component that includes on a surface thereof a plurality of microscopic mirrors arranged in an array corresponding to pixels in an image to be displayed and a bezel, said array comprising at least two laser diode arrays wherein at least one of said at least two laser diode arrays comprises at least one imaging diode array and at least one other of said at least two laser diode arrays comprises at least one preheat laser diode array, wherein said two parallel light beams are directed to said at least two digital micromirror devices for image processing, such that as said two parallel light beams are reflected out onto said printing surface, said two parallel light beams are recombined into a single image, thereby enabling heat dissipation while stitching said two parallel beams of said at least two digital micromirror devices to a usable video path.

2. The system of claim 1 further comprising a processor that provides instructions for said stitching of said two parallel beams back to said single image.

3. The system of claim 2 wherein said processor comprises a CPU (Central Processing Unit) of a data-processing apparatus.

4. The system of claim 3 wherein said at least one signal processor communicates electronically with said at least two digital micromirror devices and with said CPU.

5. The system of claim 2 wherein said each of said at least two digital micromirror devices includes a DMD (Digital Micromirror Device) housing and a DMD epoxy maintained by a DMD assembly and wherein said system further comprises a DMD mirror surface interface upon which said DMD assembly is located.

6. The system of claim 5 wherein said each of said at least two digital micromirror devices is rotatable to an on state or an off state and wherein said system further includes a plurality of DMD cooling lines, a thermistor wire and a cooling block.

7. The system of claim 1 further comprising a plurality of laser diode cooling and electrical lines and wherein said at least two laser diode array is coupled to at least one cooling and electrical line among said plurality of laser diode cooling and electrical lines.

8. The system of claim 7 further comprising a microcontroller that communicates electrically with said at least two digital micromirror devices and said at least one signal processor, wherein each of said at least two digital micromirror devices includes a respective signal among said at least one signal processor and wherein said microcontroller provides control signals to said at least two digital micromirror devices.

9. The system of claim 7 wherein data communications with said at least two micromirror devices and said signal processor is implemented via wireless communications.

10. The system of claim 7 wherein data communications with said at least two micromirror devices and said signal processor is implemented via wired communications.

11. An image processing system, comprising:
a printing surface;
a prism that splits light from an input light source into two parallel light beams indicative of a signal image; and
a processor and at least two digital micromirror devices, wherein each of said at least two digital micromirror devices comprises at least one signal processor among a plurality of signal processors and an optical semiconductor component that includes on a surface thereof a plurality of microscopic mirrors arranged in an array corresponding to pixels in an image to be displayed, said array comprising at least two laser diode arrays wherein at least one of said at least two laser diode arrays comprises at least one imaging diode array and at least one other of said at least two laser diode arrays comprises at least one preheat laser diode array, wherein said two parallel light beams are directed to said at least two digital micromirror devices for image processing, such that as said two parallel light beams are reflected out onto said printing surface, said two parallel light beams are recombined into a single image, thereby enabling heat dissipation while stitching said two parallel beams of said at least two digital micromirror devices to a usable video path, and wherein said processor provides instructions for said stitching of said two parallel beams back to said single image.

12. The system of claim 11 wherein said processor comprises a CPU (Central Processing Unit) of a data-processing apparatus and wherein said processor processes instructions for said stitching of said two parallel beams back to said single image.

13. The system of claim 11 wherein said at least one signal processor communicates electronically with said at least two digital micromirror devices.

14. The system of claim 13 wherein said at least one laser diode array is coupled to at least one cooling and electrical line among a plurality of laser diode cooling and electrical lines and wherein said at least one laser diode array and said at least one preheat laser diode are maintained by a DMD assembly and wherein said system further comprises a DMD mirror surface interface upon which said DMD assembly is located.

15. The system of claim 13 further comprising a microcontroller that communicates electrically with said at least two digital micromirror devices and said at least one signal processor, wherein each of said at least two digital micromirror devices includes a respective signal among said at least one signal processor and wherein said microcontroller provides control signals to said at least two digital micromirror devices and wherein data communications with said at least two micromirror devices and said signal processor is implemented via wireless communications.

16. An image processing method, comprising:
providing a printing surface;
splitting light from an input light source into two parallel light beams indicative of a signal image utilizing a prism; and
directing said two parallel light beams to at least two digital micromirror devices for image processing, wherein each of said at least two digital micromirror devices comprises at least one signal processor and an optical semiconductor component that includes on a surface thereof a plurality of microscopic mirrors arranged in an array corresponding to pixels in an image to be displayed, said array comprising at least two laser diode arrays wherein at least one of said at least two laser diode arrays comprises at least one imaging diode array and at least one other of said at least two laser diode arrays comprises at least one preheat laser diode array, such that said two parallel light beams are reflected out onto said printing surface, said two parallel light beams are recombined into a single image, thereby enabling heat dissipation while stitching said two parallel beams of said at least two digital micromirror devices to a usable video path.

17. The method of claim 16 further comprising processing with said processor, instructions for said stitching of said two parallel beams back to said single image.

18. The method of claim 16 further comprising providing a plurality of DMD cooling lines, a thermistor wire and a cooling block.

19. The method of claim 16 further comprising providing a microcontroller that communicates electrically with said at least two digital micromirror devices and said at least one signal processor, wherein each of said at least two digital micromirror devices includes a respective signal among said at least one signal processor and wherein said microcontroller provides control signals to said at least two digital micromirror devices and wherein said at least one laser diode array is coupled to at least one cooling and electrical line among a plurality of laser diode cooling and electrical lines.

20. The method of claim 19 further comprising:
providing a DMD assembly for maintaining said at least two digital micromirror devices;

configuring a DMD mirror surface interface upon which said DMD assembly is located.

* * * * *